United States Patent
Keledjian et al.

(10) Patent No.: US 8,932,685 B2
(45) Date of Patent: *Jan. 13, 2015

(54) METHODS FOR MAKING CURED SEALANTS BY ACTINIC RADIATION AND RELATED COMPOSITIONS

(75) Inventors: Raquel Keledjian, Glendale, CA (US); Renhe Lin, Stevenson Ranch, CA (US); Chandra Rao, Valencia, CA (US); Bruce Virnelson, Valencia, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 571 days.

This patent is subject to a terminal disclaimer.

(21) Appl. No.: 12/855,729

(22) Filed: Aug. 13, 2010

(65) Prior Publication Data
US 2012/0040104 A1    Feb. 16, 2012

(51) Int. Cl.
| | | |
|---|---|---|
| *C08J 7/04* | (2006.01) | |
| *C09J 181/02* | (2006.01) | |
| *C08G 75/02* | (2006.01) | |
| *C08L 81/02* | (2006.01) | |
| *C08G 75/12* | (2006.01) | |

(52) U.S. Cl.
CPC .............. *C09J 181/02* (2013.01); *C08G 75/02* (2013.01); *C08L 81/02* (2013.01); *C08G 75/12* (2013.01)
USPC ............ 427/515; 522/172; 528/373; 528/374

(58) Field of Classification Search
USPC .................... 427/515; 522/172; 528/373, 374
See application file for complete search history.

(56) References Cited

U.S. PATENT DOCUMENTS

| | | |
|---|---|---|
| 3,640,923 A | 2/1972 | Guthrie |
| 4,366,307 A | 12/1982 | Singh et al. |
| 5,432,226 A | 7/1995 | Aonuma et al. |
| 5,912,319 A | 6/1999 | Zook et al. |
| 5,959,071 A | 9/1999 | DeMoss et al. |
| 6,015,475 A | 1/2000 | Hsieh et al. |
| 6,172,179 B1 | 1/2001 | Zook et al. |
| 6,232,401 B1 | 5/2001 | Zook et al. |
| 6,479,622 B1 | 11/2002 | Gross et al. |
| 6,551,710 B1 | 4/2003 | Chen et al. |
| 2002/0007015 A1 | 1/2002 | DeMoss et al. |
| 2002/0013450 A1 | 1/2002 | Zook et al. |
| 2004/0039121 A1 | 2/2004 | Zook et al. |
| 2006/0270796 A1 | 11/2006 | Sawant et al. |
| 2007/0142605 A1 | 6/2007 | Bojkova et al. |
| 2009/0047531 A1 | 2/2009 | Bartley et al. |
| 2009/0286002 A1 | 11/2009 | Iezzi et al. |
| 2009/0286015 A1 | 11/2009 | Matsukawa et al. |

FOREIGN PATENT DOCUMENTS

| | | |
|---|---|---|
| JP | 2001-089568 | 4/2001 |
| JP | 2004-326042 | 11/2004 |

OTHER PUBLICATIONS

Mark Caddy, Terence J. Kemp, "Photoactive Liquid polysulfides: preparation, characterisation, photocuring and potential applications", Elsevier, European Polymer Journal 39 (2003), pp. 461-487, Department of Chemistry, University of Warwick, Coventry CV4 7AL, UK.

U.S. Appl. No. 12/855,725, filed Aug. 13, 2010, entitled: Compositions Comprising Thiol-Terminated Polymers and Sulfur-Containing Ethylenically Unsaturated Silanes and Related Cured Sealants.

*Primary Examiner* — Robert S Walters, Jr.

(74) *Attorney, Agent, or Firm* — William R. Lambert

(57) ABSTRACT

Disclosed are methods for making a cured sealant. The methods include depositing an uncured sealant composition on a substrate and exposing the uncured sealant composition to actinic radiation to provide a cured sealant. The uncured sealant composition includes a thiol-terminated polythioether and a polyene comprising a polyvinyl ether and/or a polyallyl compound. Related sealant compositions are also disclosed.

25 Claims, No Drawings

METHODS FOR MAKING CURED SEALANTS BY ACTINIC RADIATION AND RELATED COMPOSITIONS

CROSS-REFERENCE TO RELATED APPLICATION

This application is related to U.S. patent application Ser. No. 12/855,725, entitled, "Compositions Comprising Thiol-Terminated Polymers And Sulfur-Containing Ethylenically Unsaturated Silanes And Related Cured Sealants", filed concurrently herewith.

FIELD OF THE INVENTION

The present invention is directed to methods for making a cured sealant, such as an aerospace sealant, through the use of actinic radiation. The present invention is also directed to compositions suitable for use in such methods.

BACKGROUND OF THE INVENTION

Thiol-terminated sulfur-containing compounds are known to be well-suited for use in various applications, such as aerospace sealant compositions, due, in large part, to their fuel-resistant nature upon cross-linking. Other desirable properties for aerospace sealant compositions include low temperature flexibility, short curing time (the time required to reach a predetermined strength) and elevated-temperature resistance, among others. Sealant compositions exhibiting at least some of these characteristics and containing thiol-terminated sulfur-containing compounds are described in, for example, U.S. Pat. Nos. 2,466,963, 4,366,307, 4,609,762, 5,225,472, 5,912,319, 5,959,071, 6,172,179, 6,232,401, 6,372,849 and 6,509,418.

Thus, sealant compositions that are storage stable but, when applied to a substrate, can be cured quickly to form a cured sealant having the characteristics described above are desired. The present invention was made in view of the foregoing.

SUMMARY OF THE INVENTION

In certain respects, the present invention is directed to methods for making a cured sealant comprising: (a) depositing an uncured sealant composition on a substrate; and (b) exposing the uncured sealant composition to actinic radiation to provide a cured sealant. In these methods, the uncured sealant composition comprises: (i) a thiol-terminated polythioether; and (ii) a polyene comprising a polyvinyl ether and/or a polyallyl compound.

In other respects, the present invention is directed to compositions comprising: (a) a thiol-terminated polythioether; and (b) a polyene comprising a polyvinyl ether and/or a polyallyl compound. In these compositions, an essentially stoichiometric equivalent amount of thiol groups to ene groups is present.

In still other respects, the present invention is directed to compositions comprising: (a) a thiol-terminated polythioether; (b) a polyene comprising a polyvinyl ether and/or a polyallyl compound; and (c) a photoinitiator.

The present invention is also directed to, inter alia, sealants deposited from such methods and compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As indicated, certain embodiments of the present invention are directed to methods for making a cured sealant. These methods comprise depositing an uncured sealant composition on a substrate. The uncured sealant composition can be deposited on any of a variety of substrates. Common substrates can include titanium, stainless steel, aluminum, anodized, primed, organic coated and chromate coated forms thereof, epoxy, urethane, graphite, fiberglass composite, KEVLAR®, acrylics and polycarbonates. The uncured sealant composition can be deposited on the surface of a substrate or over an underlayer, such as a primer layer or a previously applied sealant.

The uncured sealant compositions used in the methods of the present invention comprise a thiol-terminated polythioether. As used herein, the term "polythioether" refers to compounds comprising at least two thioether linkages, that is "—C—S—C—" linkages. Thiol-terminated polythioethers and methods for their production, which are suitable for use in the present invention include, for example, those disclosed in U.S. Pat. No. 4,366,307 at col. 3, line 7 to col. 9, line 51 and U.S. Pat. No. 6,172,179 at col. 5, line 42 to col. 12, line 7, the cited portions of which being incorporated by reference herein. In certain embodiments, therefore, the thiol-terminated polythioether comprises a polythioether that includes a structure having the formula (I):

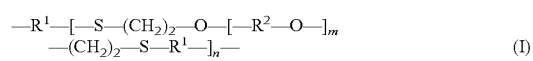

(I)

wherein: (1) each $R^1$ independently denotes a $C_{2-6}$ n-alkylene, $C_{2-6}$ branched alkylene, $C_{6-8}$ cycloalkylene or $C_{6-10}$ alkylcycloalkylene group, $—[(—CH_2—)_p—X—]_q—(—CH_2—)_r—$, or $—[(—CH_2—)_p—X—]_q—(—CH_2—)_r—$ in which at least one $—CH_2—$ unit is substituted with a methyl group, wherein (i) each X is independently selected from O, S and $—NR^6—$, wherein $R^6$ denotes H or methyl; (ii) p is an integer having a value ranging from 2 to 6; (iii) q is an integer having a value ranging from 0 to 5; and (iv) r is an integer having a value ranging from 2 to 10; (2) each $R^2$ independently denotes a $C_{2-6}$ n-alkylene, $C_{2-6}$ branched alkylene, $C_{6-8}$ cycloalkylene or $C_{6-10}$ alkylcycloalkylene group, or —[(—$CH_2$—)$_p$—X—]$_q$—(—$CH_2$—)$_r$—, wherein (i) each X is independently selected from O, S and —$NR^6$—, wherein $R^6$ denotes H or methyl; (ii) p is an integer having a value ranging from 2 to 6; (iii) q is an integer having a value ranging from 0 to 5; and (iv) r is an integer having a value ranging from 2 to 10; (3) m is a rational number from 0 to 10; and (4) n is an integer having a value ranging from 1 to 60. Such polythioethers and methods for their production are described in U.S. Pat. No. 6,172,179 within the portion thereof incorporated herein by reference above.

More particularly, in certain embodiments, the thiol-terminated polythioether has a structure according to formula (II):

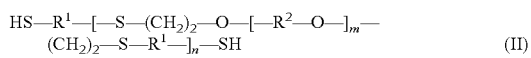

$$HS—R^1—[—S—(CH_2)_2—O—[—R^2—O—]_m—(CH_2)_2—S—R^1—]_n—SH \qquad (II)$$

in which $R^1$, $R^2$, m and n are as described above with respect to formula (I).

In certain embodiments, the thiol-terminated polythioether is polyfunctionalized. As a result, in certain embodiments, the thiol-terminated polythioether has a structure according to formula (III):

$$B\text{-}(A\text{-}[R^3]_y—SH)_z \qquad (III)$$

wherein: (1) A denotes a structure according to formula (I); (2) y is 0 or 1; (3) $R^3$ denotes a single bond when y=0 and —S—$(CH_2)_2$—[—O—$R^2$—]$_m$—O— when y=$_1$; (4) z is an integer from 3 to 6; and (5) B denotes a z-valent residue of a polyfunctionalizing agent.

Suitable methods for making such polyfunctionalized polythioether polymers are disclosed in, for example, U.S. Pat. No. 6,172,179 at col. 7, line 48 to col. 12, line 7, the cited portion of which being incorporated herein by reference above.

The uncured sealant compositions used in the methods of the present invention also comprise a polyene comprising a polyvinyl ether and/or a polyallyl compound. As used herein, the term "polyene" refers to a compound containing at least two carbon-carbon double bonds (C═C).

In certain embodiments, the polyallyl compound present in the uncured sealant composition comprises a triallyl compound, which refers to compounds comprising three allyl groups (C═C—C) and which include, for example, triallyl cyanurate (TAC) and triallyl isocyanurate (TAIC).

In certain embodiments, the polyene comprises a polyvinyl ether. Suitable polyvinyl ethers include, for example, those represented by Formula (IV)

$$CH_2\!=\!CH—O—(—R^5—O—)_m—CH\!=\!CH_2 \qquad (IV)$$

where $R^5$ in formula (IV) is a $C_{2-6}$ n-alkylene group, a $C_{2-6}$ branched alkylene group, a $C_{6-8}$ cycloalkylene group, a $C_{6-10}$ alkylcycloalkylene group, or —[(—$CH_2$—)$_p$—O—]$_q$—(—$CH_2$—)$_r$—, where p is an integer having a value ranging from 2 to 6, q is an integer having a value ranging from 1 to 5, and r is an integer having a value ranging from 2 to 10.

The materials of formula (IV) are divinyl ethers. Suitable divinyl ethers include those compounds having at least one oxyalkylene group, such as from 1 to 4 oxyalkylene groups, i.e., those compounds in which m in formula (IV) is an integer from 1 to 4. In some cases, m in formula (IV) is an integer from 2 to 4. It is also possible to employ commercially available divinyl ether mixtures to produce the polymers of the present invention. Such mixtures are characterized by a non-integral average value for the number of oxyalkylene units per molecule. Thus, m in formula (IV) can also take on rational number values between 0 and 10.0, such as between 1.0 and 10.0, between 1.0 and 4.0, or between 2.0 and 4.0.

Suitable divinyl ether monomers for use in the present invention include, for example, divinyl ether, ethylene glycol divinyl ether (EG-DVE) (R in formula (IV) is ethylene and m is 1), butanediol divinyl ether (BD-DVE) (R in formula (IV) is butylene and m is 1), hexanediol divinyl ether (HD-DVE) (R in formula (IV) is hexylene and m is 1), diethylene glycol divinyl ether (DEG-DVE) (R in formula (IV) is ethylene and m is 2), triethylene glycol divinyl ether (R in formula (IV) is ethylene and m is 3), tetraethylene glycol divinyl ether (R in formula (IV) is ethylene and m is 4), cyclohexanedimethanol divinyl ether, polytetrahydrofuryl divinyl ether and mixtures thereof. In some cases, trivinyl ether monomers, such as trimethylolpropane trivinyl ether; tetrafunctional ether monomers, such as pentaerythritol tetravinyl ether; and mixtures of two or more such polyvinyl ether monomers can be used. The polyvinyl ether material can have one or more pendant groups selected from alkyl groups, hydroxyl groups, alkoxy groups and amine groups.

Useful divinyl ethers in which R in formula (IV) is $C_{2-6}$ branched alkylene can be prepared by reacting a polyhydroxy compound with acetylene. Exemplary compounds of this type include compounds in which R in formula (IV) is an alkyl-substituted methylene group such as —CH($CH_3$)— (for example "PLURIOL®" blends such as PLURIOL®E-200 divinyl ether (BASF Corp. of Parsippany, N.J.), for which R in formula (IV) is ethylene and m is 3.8) or an alkyl-substituted ethylene (for example —$CH_2CH(CH_3)$— such as "DPE" polymeric blends including DPE-2 and DPE-3 (International Specialty Products of Wayne, N.J.)).

Other useful divinyl ethers include compounds in which R in formula (IV) is polytetrahydrofuryl (poly-THF) or polyoxyalkylene, such as those having an average of about 3 monomer units.

Two or more divinyl ether monomers of the formula (IV) can be used if desired.

In certain embodiments, the uncured sealant composition used in the methods of the present invention also comprises an ethylenically unsaturated silane, such as, for example, a sulfur-containing ethylenically unsaturated silane, which has been shown to, in at least some cases, improve the adhesion of a cured sealant formed by the methods of the present invention to a metal substrate (to an extent greater than achieved when a conventional adhesion promoter, such as those described below, is used). As used herein, the term "sulfur-containing ethylenically unsaturated silane" refers to a molecular compound that comprises, within the molecule, (i) at least one sulfur (S) atom, (ii) at least one, in some cases at least two, ethylenically unsaturated carbon-carbon bonds, such as a carbon-carbon double bonds (C═C); and (iii) at least one silane group (

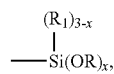

$$\underset{|}{\overset{(R_1)_{3-x}}{\phantom{|}}}\\ —Si(OR)_x,$$

wherein R and $R_1$ each independently represent an organic group and x is 1, 2, or 3).

In certain embodiments, the sulfur-containing ethylenically unsaturated silane, which is suitable for use in the uncured sealant compositions used in the methods of the present invention, itself comprises the reaction product of reactants comprising: (i) a mercaptosilane, and (ii) a polyene. As used herein, the term "mercaptosilane" refers to a molecular compound that comprises, within the molecule, (i) at least one mercapto (—SH) group, and (ii) at least one silane group (defined above). Suitable mercaptosilanes include, for example, those having a structure according to formula (V):

$$HS—R—Si(R_1)_m(OR')_{(3-m)} \quad (V)$$

wherein: (i) R is a divalent organic group; (ii) R' is hydrogen or an alkyl group; (iii) $R_1$ is hydrogen or an alkyl group; and (iv) m is an integer from 0 to 2.

Specific examples of mercaptosilanes, which are suitable for use in preparing the sulfur-containing ethylenically unsaturated silanes suitable for use in the present invention, include, without limitation, γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane mercaptomethyltriethoxysilane, and the like, including combinations thereof.

In certain embodiments, the polyene used to prepare the sulfur-containing ethylenically unsaturated silanes suitable for use in the present invention comprises a triene, which refers to a compound containing three carbon-carbon double bonds, such as is the case with the triallyl compounds mentioned above.

The Examples herein illustrate a suitable method for producing the sulfur-containing ethylenically unsaturated silanes suitable for use in the present invention. In certain embodiments, the polyene comprises a triene, such as one or more of the foregoing triallyl compounds, and the mercaptosilane and triene are reacted together in relative amounts such that the resulting reaction product theoretically comprises an average of at least two ethylenically unsaturated groups per molecule.

The compositions of the present invention will often contain an essentially stoichiometric equivalent amount of thiol groups to "ene" groups in order to obtain a cured sealant having acceptable sealant properties as described herein upon exposure of the composition to actinic radiation. As used herein, "essentially stoichiometric equivalent" means that the number of thiol groups and "ene" groups present in the compositions differ by no more than 10% from each other, in some cases, no more than 5% or, in some cases, no more than 1% or no more than 0.1%. In some cases, the number of thiol groups and "ene" groups present in the composition are equal. Moreover, as will be appreciated, the source of "ene" groups in the compositions of the present invention can include the ethylenically unsaturated silane itself (if used) as well as the other polyene(s) included in the composition. In certain embodiments, the ethylenically unsaturated silane described earlier is present in an amount such that 0.1 to 30, such as 1 to 30, or, in some cases, 10 to 25 percent of the total number of ethylenically unsaturated groups present in the composition are part of an ethylenically unsaturated silane molecule, based on the number of ethylenically unsaturated groups in the composition.

As indicated, the methods of the present invention comprise exposing the uncured sealant composition to actinic radiation to provide a cured sealant. In certain embodiments, particularly when the cured sealant is to be formed by exposure of the previously described uncured sealant composition to UV radiation, the composition also comprises a photoinitiator. As will be appreciated by those skilled in the art, a photoinitiator absorbs ultraviolet radiation and transforms it into a radical that initiates polymerization. Photoinitiators are classified in two major groups based upon a mode of action, either or both of which may be used in the compositions described herein. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of photoinitiators that may be used in the present invention include benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthixantone, a-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, bis(2,4,6-trimethylbenzoyl)phenyl phosphine oxide, 2,6-dichlorobenzoyldiphenylphosphine oxide, and 2,6-dimethoxybenzoyldiphenylphosphine oxide, bisacylphosphine oxides, e.g., bis(2,6-dimethyoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide, and mixtures thereof.

In certain embodiments, the compositions described herein comprise 0.01 up to 15 percent by weight of photoinitiator or, in some embodiments, 0.01 up to 10 percent by weight, or, in yet other embodiments, 0.01 up to 5 percent by weight of photoinitiator based on the total weight of the composition.

Fillers useful in the certain embodiments of the compositions described herein include those commonly used in the art, including conventional inorganic fillers, such as fumed silica, calcium carbonate ($CaCO_3$), and carbon black, as well as lightweight fillers. Fillers that are substantially transparent to ultraviolet radiation, such as fumed silica, may be particularly useful in some embodiments. Suitable lightweight fillers include, for example, those described in U.S. Pat. No. 6,525,168 at col. 4, lines 23-55, the cited portion of which being incorporated herein by reference and those described in United States Patent Application Publication No. US 2010-0041839 A1 at [0016] to [0052], the cited portion of which being incorporated herein by reference.

In some embodiments, the compositions described herein include a photoactive filler. As used herein, the term "photoactive filler" refers to a filler that comprises a material that is photoexcitable upon exposure to, and absorption of, ultraviolet and/or visible radiation. A photoactive material is a material that, when exposed to light having higher energy than the energy gap between the conduction band and the valence band of the crystal, causes excitation of electrons in the valence band to produce a conduction electron thereby laving a hole behind on the particular valence band. Exemplary, but non-limiting, photoactive fillers suitable for use in certain composition described herein are metal oxides, such as, for example, zinc oxide, tin oxide, ferric oxide, dibismouth trioxide, tungsten trioxide, titanium dioxide (including the brookite, anatase, and/or rutile crystalline forms of titanium dioxide), and mixtures thereof.

In certain embodiments, the compositions include 5 to 60 weight percent of the filler or combination of fillers, such as 10 to 50 weight percent, based on the total weight of the composition, so long as the presence of such fillers in such amounts does not cause a significant detrimental affect the performance of the composition.

In addition to the foregoing ingredients, certain compositions of the invention can optionally include one or more of the following: colorants (including photoactive dyes), thixotropes, conventional adhesion promoters, retardants, solvents and masking agents, among other components.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

Photoactive dyes, which provide reversible or permanent photoinduced color change effects, are also suitable for use in the compositions described herein. Suitable photoactive dyes are commercially available from Spectra Group Limited, Inc., Millbury, Ohio.

Thixotropes, for example silica, are often used in an amount from 0.1 to 5 weight percent, based on the total weight of the composition.

Retardants, such as stearic acid, likewise often are used in an amount from 0.1 to 5 weight percent, based on the total weight of the composition. Conventional adhesion promoters, if employed, are often present in amount from 0.1 to 15 weight percent, based on the total weight of the composition. Suitable such adhesion promoters include phenolics, such as METHYLON phenolic resin available from Occidental Chemicals, and organosilanes, such as epoxy, mercapto or amino functional silanes, such as Silquest A-187 and Silquest A-1100 available from Momentive Performance Materials. Masking agents, such as pine fragrance or other scents, which are useful in covering any low level odor of the composition, are often present in an amount from 0.1 to 1 weight percent, based on the total weight of the composition.

In certain embodiments, the compositions comprise a plasticizer which, in at least some cases, may allow the composition to include polymers which have a higher $T_g$ than would ordinarily be useful in an aerospace sealant. That is, use of a plasticizer may effectively reduce the $T_g$ of the composition, and thus increase the low-temperature flexibility of the cured composition beyond that which would be expected on the basis of the $T_g$ of the polymer alone. Plasticizers that are useful in certain embodiments of the compositions of the present invention include, for example, phthalate esters, chlorinated paraffins, and hydrogenated terphenyls. The plasticizer or combination of plasticizers often constitute 1 to 40 weight percent, such as 1 to 10 weight percent of the composition. In certain embodiments, depending on the nature and amount of the plasticizer(s) used in the composition, polymers of the invention which have $T_g$ values up to $-50°$ C., such as up to $-55°$ C., can be used.

In certain embodiments, the compositions can further comprise one or more organic solvents, such as isopropyl alcohol, in an amount ranging from, for example, 0 to 15 percent by weight on a basis of total weight of the composition, such as less than 15 weight percent and, in some cases, less than 10 weight percent. In certain embodiments, however, the compositions of the present invention are substantially free or, in some cases, completely free, of any solvent, such as an organic solvent or an aqueous solvent, i.e., water. Stated differently, in certain embodiments, the compositions of the present invention are substantially 100% solids.

As should be appreciated from the foregoing description, the present invention is also directed to compositions comprising: (a) a thiol-terminated polythioether; and (b) a polyene comprising a polyvinyl ether and/or a polyallyl compound. These compositions comprise an essentially stoichiometric equivalent amount of thiol groups and ene groups. Moreover, these compositions may comprise one or more of the additional optional components described earlier.

As should also be appreciated from the foregoing description, the present invention is also directed to compositions comprising: (a) a thiol-terminated polythioether; (b) a polyene comprising a polyvinyl ether and/or a polyallyl compound; and (c) a photoinitiator. Moreover, these compositions may comprise one or more of the additional optional components described earlier.

In certain embodiments, the compositions of the present invention have a $T_g$ when cured not higher than $-55°$ C., such as not higher than $-60°$ C., or, in some cases, not higher than $-65°$ C.

As described above, the methods of the present invention comprise exposing the uncured sealant composition described above to actinic radiation to provide a cured sealant. The Examples herein describe suitable conditions for performing this method step. In some embodiments of the present invention, the thiol-ene reaction, which forms the cured sealant, is effected by irradiating an uncured composition comprising: (a) a thiol-terminated polythioether (such as any of those described above); and (b) a polyene comprising a polyvinyl ether and/or a polyallyl compound as described above, with actinic radiation. As used herein, "actinic radiation" encompasses electron beam (EB) radiation, ultraviolet (UV) radiation, and visible light. In many cases, the thiol-ene reaction is effected by irradiating the composition with UV light and, in such cases, as mentioned above, the composition often further comprises a photoinitiator, among other optional ingredients.

Ultraviolet radiation from any suitable source which emits ultraviolet light having a wavelength ranging from, for example, 180 to 400 nanometers, may be employed to initiate the thiol-ene reaction described above and thereby form the cured sealant. Suitable sources of ultraviolet light are generally known and include, for example, mercury arcs, carbon arcs, low pressure mercury lamps, medium pressure mercury lamps, high pressure mercury lamps, swirl-flow plasma arcs and ultraviolet light emitting diodes. Certain embodiments of the compositions of the invention can exhibit an excellent degree of cure in air at relatively low energy exposure in ultraviolet light.

In fact, it has been discovered, surprisingly, that UV cure of the compositions of the present invention to depths of up to 2 inches or more can be achieved in some cases. This means that cured sealants having a thickness of 2 inches or more, and having desirable sealant properties described herein, can be achieved by exposure of the compositions described herein to actinic radiation, such as ultraviolet radiation, in air at relatively low energy exposure.

As indicated, certain embodiments of the present invention are directed to compositions, such as sealant, coating, and/or electrical potting compositions. As used herein, the term "sealant composition" refers to a composition that is capable of producing a film that has the ability to resist atmospheric conditions, such as moisture and temperature and at least partially block the transmission of materials, such as water, fuel, and other liquid and gasses. In certain embodiments, the sealant compositions of the present invention are useful, e.g., as aerospace sealants and linings for fuel tanks.

In certain embodiments, the sealants produced according to the methods of the present invention are fuel-resistant. As used herein, the term "fuel resistant" means that a sealant has a percent volume swell of not greater than 40%, in some cases not greater than 25%, in some cases not greater than 20%, in yet other cases not more than 10%, after immersion for one week at 140° F. (60° C.) and ambient pressure in jet reference fluid (JRF) Type I according to methods similar to those described in ASTM D792 or AMS 3269, incorporated herein by reference. Jet reference fluid JRF Type I, as employed herein for determination of fuel resistance, has the following composition (see AMS 2629, issued Jul. 1, 1989), §3.1.1 et seq., available from SAE (Society of Automotive Engineers, Warrendale, Pa.) (that is incorporated herein by reference): herein by reference):

| | |
|---|---|
| Toluene | 28 ± 1% by volume |
| Cyclohexane (technical) | 34 ± 1% by volume |
| Isooctane | 38 ± 1% by volume |
| Tertiary dibutyl disulfide | 1 ± 0.005% by volume (doctor sweet) |

In certain embodiments, sealants produced according to the present invention have an elongation of at least 100% and a tensile strength of at least 250 psi when measured in accordance with the procedure described in AMS 3279, §3.3.17.1, test procedure AS5127/1, §7.7.

In certain embodiments, sealants produced according to the present invention have a tear strength of at least 25 pounds per linear inch (pli) or more when measured according to ASTM D624 Die C.

As should be apparent from the foregoing description, the present invention is also directed to methods for sealing an aperture utilizing a composition of the present invention. These methods comprise (a) applying a composition of the present invention to a surface to seal the aperture; and (b) curing the composition by exposing the composition to actinic radiation. As will also be appreciated, the present invention is also directed to aerospace vehicles comprising at least a sealant formed as described herein.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Polythioether Polymer Synthesis

A resin was prepared in the manner described in Example 1 of U.S. Pat. No. 6,232,401. The polymer (theoretical functionality: 2.2) had a mercaptan equivalent weight of 1640 and a viscosity of 70 poise.

Example 2

Polythioether Polymer Synthesis

Triallylcyanurate (TAC) (36.67 g, 0.15 mole) and dimercaptodioxaoctane (DMDO) (449.47 g, 2.47 moles) were charged in a 1-liter 4-neck round-bottom flask. The flask was equipped with a stirrer, gas-passing adapter and thermometer. Stirring was started. The flask was flushed with dry nitrogen, a solution of potassium hydroxide (0.012 g; concentration: 50%) was added and the reaction mixture was heated to 76° C. A solution of radical initiator Vazo-67 (0.32 g) in diethylene glycol divinyl ether (316.44 g, 2.00 moles) was introduced in the reaction mixture over a period of 2 hours during which a temperature of 66-76° C. was maintained. Following the completion of the addition of the divinyl ether, temperature of the reaction mixture increased to 84° C. The reaction mixture was cooled to 74° C. and nine portions of Vazo-67 (~0.15 g each) were added at an interval of 1 hour while the temperature was maintained at 74-77° C. The reaction mixture was heated at 100° C. for 2 hours, cooled to 80° C., and evacuated at 68-80° C./5-7 mmHg for 1.75 hr. The resulting polymer (theoretical functionality: 2.8) had a mercaptan equivalent weight of 1566, and a viscosity of 140 poise.

Example 3

Polythioether Polymer Synthesis

A resin was prepared in a manner similar to that described in Example 16 of U.S. Pat. No. 4,366,307, with the exception that trimethylolpropane (TMP) was used to replace HDT (1,5,13-trihydroxy-7-oxa-dithiatridecane) that was synthesized in Example 3 of U.S. Pat. No. 4,366,307. The resulting polymer (theoretical functionality: 2.75) had a mercaptan equivalent weight of 1704, and a viscosity of 400 poise.

Example 4

Curing of Polymer Example 1 with DEG-DVE

The curing reaction was performed in a 100 g plastic container with lid. The polymer described in Example 1 (50.00 g, 0.03 equivalent mole) and diethylene glycol divinyl ether (DEG-DVE) (2.40 g, 0.03 equivalent mole) were added to the 100 g container. The container was placed in a high speed mixer (DAC 600 FVZ) and mixed for 1 minute at 2300 rpm. The container was opened and Irgacure® 2022 (A Bis Acyl Phosphine/α-Hydroxyketone photoinitiator from BASF Corporation, 0.54 g, 1% by weight) was added, and the container was closed and placed in the speed mixer again and mixed for 30 seconds at 2300 rpm. The polymer was poured over a circular (5 inches in diameter) metal lid (pre-treated with Valspar Mold Release 225), and placed under UV light for 15 seconds, after which time the polymer had completely cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the polymer composition. Up to 2 inches of cured polymer was obtained. The hardness of the polymer was measured with a Durometer to be 20 Shore A. The polymer was cut into six, ½ inch dog bones with a tensile strength gauge, and three of the specimens were used to measure dry (no water or fuel immersion) tensile strength and elongation, via Instron. The results (an average of the three) are as follows: 250 psi (tensile strength), and 1011% (elongation). One of the ½ inch dog bones was cut in half and placed in 20 mL vial with lid and placed in a 200° F. (93° C.) oven. The sample was kept at 200° F. (93° C.) for 2 days, after which time the hardness was checked to be 10 Shore A. Tensile strength and elongation data were obtained according to ASTM D 412 and hardness data was obtained according to ASTM D 2240.

Example 5

Curing of a Blend of Polymer Example 1 and Polymer Example 2 with DEG-DVE

The curing reaction was performed in a 300 g plastic container with lid. The polymer described in Example 1 (120.00 g, 0.07 equivalent mole), the polymer described in Example 2 (30.00 g, 0.02 equivalent mole), and diethylene glycol divinyl ether (DEG-DVE) (7.25 g, 0.09 equivalent mole) were added to the 300 g container. The container was placed in a speed mixer (DAC 600 FVZ) and mixed for 1 minute at 2300 rpm. The container was opened and Irgacure® 2022 (0.79 g, 0.5% by weight) was added, and the container was closed and placed in the speed mixer again and mixed for 30 seconds at 2300 rpm. The polymer was equally distributed among 3 circular (5 inches in diameter) metal lids (pre-treated with Valspar Mold Release 225), and placed under UV light for 15 seconds, after which time the polymer had completely cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the polymer composition. Up to 2 inches of cured polymer was obtained. The hardness of the polymer was measured with a Durometer to be 22 Shore A. The polymer was cut into twenty-one, ½ inch dog bones with a tensile strength gauge. Dry tensile strength and elongation were measured, for 3 of the specimens via Instron. The results (an average of the three) are as follows: 258 psi (tensile strength), and 625% (elongation). Three of the ½ inch dog bones were placed in a glass jar, with a lid, and covered with jet reference fuel (JRF Type I) and placed in a 140° F. (60° C.) water bath for 7 days. The results (an average of the three) are as follows: 287 psi (tensile strength) and 755% (elongation). Three more of the dog bones were placed in glass jar with lid, covered with tap water, and placed in a 95° F. (35° C.) oven. The samples were kept in the 95° F. (35° C.) oven for 41 days. The results (an average of the three) are as follows: 19 Shore A (hardness), 191 psi (tensile strength), and 713% (elongation). Three additional samples were taken used for 3% salt water immersion test. The samples were placed in glass jar with lid, placed in a 140° F. (60° C.) oven for 4.5 days. The results (an average of the three) are as follows: 20 A (hardness), 224 psi (tensile strength), and 765% (elongation). Tensile strength and elongation data were obtained according to ASTM D 412 and hardness data was obtained according to ASTM D 2240.

Example 6

Curing of Blend of Example 1 and Example 2 with TEG-DVE

The curing reaction was performed in a 100 g plastic container with lid. The polymer described in Example 1 (40.80 g, 0.02 equivalent mole), the polymer described in Example 2 (10.20 g, 0.01 equivalent mole), and triethylene glycol divinyl ether (TEG-DVE) (3.15 g, 0.03 equivalent mole) were added to the 100 g container. The container was placed in a speed mixer (DAC 600 FVZ) and mixed for 1 minute at 2300 rpm. The container was opened and Irgacure® 2022 (0.26 g, 0.5% by weight) was added, and the container was placed in the speed mixer again and mixed for 30 seconds at 2300 rpm. The polymer was poured over a circular (5 inches in diameter) metal lid (pre-treated with Valspar Mold Release 225), and placed under UV light for 15 seconds, after which time the polymer had completely cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the polymer composition. Up to 2 inches of cured polymer was obtained. The hardness of the polymer was measured with a Durometer to be 22 Shore A. The polymer was cut into six, ½ inch dog bones with a tensile strength gauge. Dry tensile strength and elongation were measured for three of the specimens via the Instron. The results (an average of the three) are as follows: 182 psi (tensile strength) and 660% (elongation). Three of the ½ inch dog bones were placed in a glass jar, with a lid, and covered with jet reference fuel (JRF Type I) and placed in a 140° F. (60° C.) water bath for 7 days. The results (an average of the three) are as follows: 248 psi (tensile strength), 658% (elongation). Tensile strength and elongation data were obtained according to ASTM D 412 and hardness data was obtained according to ASTM D 2240.

Example 7

Curing of Polymer Example 3 with DEG-DVE

The curing reaction was performed in a 100 g plastic container with lid. The polymer described in Example 3 (50.00 g, 0.03 equivalent mole) and diethylene glycol divinyl ether (DEG-DVE) (2.32 g, 0.03 equivalent mole) were added to the 100 g container. The container was placed in a speed mixer (DAC 600 FVZ) and mixed for 1 minute at 2300 rpm. The container was opened and Irgacure® 2022 (0.52 g, 1% by weight) was added, and the container was closed and placed in the speed mixer again and mixed for 30 seconds at 2300 rpm. The polymer was poured over a circular (5 inches in diameter) metal lid (pre-treated with Valspar Mold Release 225), and placed under UV light for 15 seconds, after which time the polymer had completely cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the polymer composition. Up to ¼ inches of cured polymer was obtained. The hardness of the polymer was measured with a Durometer to be 18 Shore A. The polymer was cut into six, ½ inch dog bones with tensile strength gauge, and three of the specimens were used to measure dry (no water or fuel immersion) tensile strength and elongation, via the Instron. The results (an average of the three) are as follows: 81 psi (tensile strength), and 166% (elongation). Tensile strength and elongation data were obtained according to ASTM D 412 and hardness data was obtained according to ASTM D 2240.

Example 8

Sealant Composition Using Polymer Example 1

A sealant composition was prepared by mixing the polymer described in Example 1 with diethylene glycol divinyl ether (DEG-DVE) and other ingredients described in Table 1:

TABLE 1

| Component | Weight, in grams |
|---|---|
| Polymer Example 1 | 300.00 |
| DEG-DVE | 14.46 |
| 3-Mercaptopropyltrimethoxysilane | 1.59 |
| Silica | 31.47 |
| Calcium carbonate | 9.45 |
| IRGACURE ® 2022 | 0.81 |

All ingredients described in Table 1 were intimately mixed. A portion of the sealant composition was poured into a 2" diameter plastic cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the sealant composition. Up to 1.5 inches of cured sealant was obtained.

Another portion of the sealant composition was poured between two polyethylene sheets, pressed into a ⅛" thick sheet using a hydraulic press, and cured using the same curing unit described previously. A ⅛" thick flat sheet of cured sealant was obtained for tensile strength, elongation, tear strength and hardness measurement. The data are shown in Table 4.

Example 9

Sealant Composition Using Polymer Examples 1 and 2

A sealant was prepared by mixing polymer described in Example 1 and Example 2 with triethylene glycol divinyl ether (TEG-DVE) and other ingredients described in Table 2:

TABLE 2

| Component | Weight, in grams |
|---|---|
| Polymer in Example 1 | 240.00 |
| Polymer in Example 2 | 60.00 |
| TEG-DVE | 18.60 |
| 3-Mercaptopropyltrimethoxysilane | 1.59 |
| Silica | 31.83 |
| Calcium carbonate | 9.54 |
| IRGACURE ® 2022 | 0.81 |

All ingredients described in Table 2 were intimately mixed. A portion of the sealant composition was poured into a 2" diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the sealant composition. Up to 1.5 inches of cured sealant was obtained.

Another portion of the sealant composition was poured between two polyethylene sheets, pressed into a ⅛" thick sheet using a hydraulic press, and cured using the same curing unit described previously. A ⅛" thick flat sheet of cured sealant was obtained for tensile strength, elongation, tear strength and hardness measurement. The data are shown in Table 4.

Example 10

Sealant Composition Using Polymer Example 3

A sealant was prepared by mixing polymer described in Example 3 with diethylene glycol divinyl ether (DEG-DVE) and other ingredients described in Table 3:

TABLE 3

| Component | Weight, in kilograms |
| --- | --- |
| Polymer Example 3 | 150.00 |
| DEG-DVE | 6.96 |
| Fumed Silica | 15.70 |
| Calcium Carbonate | 4.71 |
| IRGACURE ® 2022 | 0.24 |

All ingredients described in Table 3 were intimately mixed. A portion of the sealant composition was poured into a 2" diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the sealant composition. Up to ¼" inches of cured sealant was obtained.

Another portion of the sealant composition was poured between two polyethylene sheets, pressed into a ⅛" thick sheet using a hydraulic press, and cured using the same curing unit described previously. A ⅛" thick flat sheet of cured sealant was obtained for tensile strength, elongation, tear strength and hardness measurement. The data are shown in Table 3.

Example 11

Comparative Example

The curing reaction was performed in a 400 g plastic container with lid. The polymer described in Example 1 (162.00 g, 0.10 equivalent mole) and trimethylolpropane triacrylate (10.00 g, 0.10 equivalent mole) were added to the 400 g. The container was placed in a speed mixer (DAC 600 FVZ) and mixed for 1 minute at 2300 rpm. The container was opened and Irgacure® 2022 (1.72 g, 1% by weight) was added, and the container was closed and placed in the speed mixer again and mixed for 30 seconds at 2300 rpm. The polymer composition was placed under UV light for 15 seconds for curing.

The curing was achieved by using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the polymer composition. Under such a curing condition, the polymer composition did not form a solid elastomer, rather it gelled. No measurable hardness, tensile strength, and elongation were obtained.

TABLE 4

| Sealant Composition | Tensile Strength, psi | Elongation, % | Tear Strength, pli | Hardness, Shore A |
| --- | --- | --- | --- | --- |
| Example 8 | 367 | 738 | 44 | 35 |
| Example 9 | 348 | 720 | 56 | 40 |
| Example 10 | 270 | 279 | 36 | 40 |
| Example 11 | N/A[1] | N/A[1] | N/A[1] | N/A[1] |

[1]Not measurable because a solid elastomer was not formed.

Example 12

Synthesis of Sulfur-Containing Ethylenically Unsaturated Silane

In a 1-liter 4-necked round bottom flask fitted with stirrer, nitrogen inlet, and thermal probe, TAC (121.00 g, 0.49 mole) and γ-mercaptopropyltrimethoxysilane (Silquest® 189, 95.25 g, 0.49 mole) were added at room temperature (25° C., 77° F.). Upon addition there was small exotherm to 40° C. (104° F.). The reaction was slowly heated to 70° C. (158° F.). Once the temperature reached 70° C. (158° F.), Vazo-67 (0.026 g, 0.012% by weight) was added and the reaction was monitored by mercaptan titration (mercaptan titration indicating a mercaptan equivalent of greater 50,000 marked the end of the reaction). At a mercaptan equivalent of 6100, Vazo 67 (0.042 g, 0.019% by weight) was added and the reaction was allowed to stir at 70° C. (158° F.) while being monitored. At mercaptan equivalent of 16,335, Vazo-67 (0.036 g, 1.7%) was added. At mercaptan equivalent of 39,942 Vazo-67 (0.016 g, 0.007%) was added. At a mercaptan equivalent of 61,425 the reaction was considered complete and stopped.

Example 13

Curing Polythioether Polymer with DEG-DVE/Adduct Blend

The curing reaction was performed in a 300 g plastic container with lid. The polymer of Example 1 (120.00 g, 0.07 equivalent mole), DEG-DVE (4.28 g, 0.05 equivalent mole), and the adduct described in Example 12 (4.03 g, 0.02 equivalent mole) were added to a 300 g container. The container was place in a speed mixer (DAC 600 FVZ) and mixed for 30 seconds for 2300 rpm. The container was opened and Irgacure® 2022 (0.64 g, 0.5% by weight) was added, and the container was placed in the speed mixer again and mixed for 1 minute at 2300 rpm. The polymer was poured over circular (5 inches in diameter) metal lid (pre-treated with Valspar Mold Release 225), and placed under UV light for 15 seconds, after which time the polymer appeared to have cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the polymer composition. Up to 2 inches of cured polymer was obtained. The polymer was left at ambient temperature for 4 days to ensure that it had fully cured. The hardness of the polymer, measured by a Durometer was 31 Shore A. The polymer was cut into seven, ½ inch dog bones with a tensile strength gauge. Dry tensile strength and elongation were measured for three of the specimens. The results (an average of the three) are as follows: 282 psi (tensile strength) and 421% (elongation). Two of the ½ inch dog bones were placed in a glass jar, with a lid, and covered with jet reference fuel (JRF Type I) and placed in a 140° F. (60° C.) water bath for 7 days. The results (an average of the two) were as follows: 141 psi (tensile strength), 78% (elongation). Two of the ½ inch dog bones were placed in a glass jar, with lid, covered with tap water and placed in a 200° F. (93° C.) oven for 2 days. The results (an average of two) were as follows: 36 Shore A (hardness), 134 psi (tensile strength), and 50% (elongation). Tensile strength and elongation data were obtained according to ASTM D 412 and hardness data was obtained according to ASTM D 2240.

A portion of the polymer composition was spread onto a 3"×6" AMS-C-27725 coated aluminum panel and cured according the curing method described previously. An approximately ⅛" thick cured polymer film was obtained. The film was further cut into two one-inch strips and the strips were pulled back at 180 degree angles with hands. The percent of adhesion to the substrate was recorded and the results were shown in Table 7.

Example 14

Curing Polythioether Polymer with DEG-DVE/Adduct Blend

The curing reaction was performed in a 300 g plastic container with lid. The polymer described in Example 1 (120.00 g, 0.073 equivalent mole), DEG-DVE (5.20 g, 0.066 equivalent mole), and the adduct described in Example 12 (1.60 g, 0.007 equivalent mole) were added to the 300 g container. The container was placed in a speed mixer (DAC 600 FVZ) and mixed for 30 seconds for 2300 rpm. The container was opened and Irgacure® 2022 (0.63 g, 0.5% by weight) was added, and the container was placed in the speed mixer again and mixed for 1 minute at 2300 rpm. The polymer was poured over circular (5 inches in diameter) metal lid (pre-treated with Valspar Mold Release 225), and placed under UV light for 15 seconds, after which time the polymer appeared to have cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm² UV energy, measured by a UV power puck, available from EIT, Inc of Sterling, Va., was applied to the polymer composition. Up to 2 inches of cured polymer was obtained. The polymer was left at ambient temperature for 4 days to insure that it had fully cured. The hardness of the polymer, measured by a Durometer was 30 Shore A. The polymer was cut into seven, ½ inch dog bones with a tensile strength gauge. Dry tensile and elongation were measured for three of the specimens. The results (an average of the three) were as follows: 251 psi (tensile strength) and 559% (elongation). Two of the ½ inch dog bones were placed in a glass jar, with a lid, and covered with jet reference fuel (JRF Type I) and placed in a 140° F. (60° C.) water bath for 7 days. The results (an average of the two) were as follows: 202 psi (tensile strength), 351% (elongation). Two of the ½ inch dog bones were placed in a glass jar, with lid, covered with tap water and placed in a 200° F. (93° C.) oven for 2 days. The results (an average of two) were as follows: 25 Shore A (hardness), 204 psi (tensile strength), and 274% (elongation). Tensile strength and elongation data were obtained according to ASTM D 412 and hardness data was obtained according to ASTM D 2240.

A portion of the polymer composition was spread onto a 3"×6" AMS-C-27725 coated aluminum panel and cured according the method described previously. An approximately ⅛" thick cured polymer film was obtained. The film was further cut into two one-inch strips and the strips were pulled back at 180 degree angles with hands. The percent of adhesion to the substrate was recorded and the results were shown in Table 7.

Example 15

Sealant Composition

A sealant composition was prepared by mixing polymer described in Example 1 and the adduct prepared according to Example 12 with triethylene glycol divinyl ether (TEG-DVE) and other ingredients described in Table 5

TABLE 5

| Component | Charge Weight, grams |
| --- | --- |
| Polymer from Example 1 | 300.00 |
| TEG-DVE | 12.84 |
| Adduct from Example 12 | 4.02 |
| Calcium carbonate | 9.39 |
| IRGACURE ® 2022 | 1.62 |

All ingredients described in Table 5 were intimately mixed. A portion of the sealant composition was poured into a 2" diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm² UV energy, measured by a UV power puck, available from EIT, Inc of Sterling, Va., was applied to the sealant composition. Up to 1.5 inches of cured sealant was obtained.

A portion of the polymer composition was spread onto a 3"×6" AMS-C-27725 coated aluminum panel and cured according the method described previously. An approximately ⅛" thick cured polymer film was obtained. The film was further cut into two one-inch strips and the strips were pulled back at 180 degree angles with hands. The percent of adhesion to the substrate was recorded and the results were shown in Table 7.

Example 16

Curing Polythioether Polymer without Adduct

The curing reaction was performed in a 100 g plastic container with lid. The polymer described in Example 1 (50.00 g, 0.03 equivalent mole) and diethylene glycol divinyl ether (DEG-DVE) (2.0 g, 0.03 equivalent mole) were added to the 100 g container. The container was placed in a high speed mixer (DAC 600 FVZ) and mixed for 1 minute at 2300 rpm. The container was opened and Irgacure® 2022 (0.54 g, 1% by weight) was added, and the container was closed and placed in the speed mixer again and mixed for 30 seconds at 2300 rpm. The polymer was poured over a circular (5 inches in diameter) metal lid (pre-treated with Valspar Mold Release 225), and placed under UV light for 15 seconds, after which time the polymer had completely cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm² UV energy, measured by a UV power puck, available from EIT, Inc of Sterling, Va., was applied to the polymer composition. Up to 2 inches of cured polymer was obtained. The hardness of the polymer was measured with a Durometer to be 20 Shore A. The polymer was cut into six, ½ inch dog bones with a tensile strength gauge, and 3 of the specimens were used to measure dry (no water or fuel immersion) tensile strength and elongation, via Instron. The results (an average of the three) are as follows: 250 psi (tensile strength), and 1011% (elongation). One of the ½ inch dog bone was cut in half and placed in 20 mL vial with lid and placed in a 200° F. (93° C.) oven. The sample was kept at 200° F. (93° C.) for 2 days after which time the hardness was checked to be 10 Shore A.

A portion of the polymer composition was spread onto a 3"×6" AMS-C-27725 coated aluminum panel and cured according the method described previously. An approximately ⅛" thick cured polymer film was obtained. The film was further cut into two one-inch strips and the strips were pulled back at 180 degree angles with hands. The percent of adhesion to the substrate was recorded and the results were shown in Table 7.

Example 17

A sealant was prepared by mixing polymer described in Example 1 and polymer described in Example 2 with diethylene glycol divinyl ether (DEG-DVE) and other ingredients described in Table 6.

TABLE 6

| Component | Weight, grams |
|---|---|
| Polymer Example 1 | 240.00 |
| Polymer Example 2 | 60.00 |
| DEG-DVE | 14.28 |
| Silquest A-189[1] | 0.77 |
| Water | 0.16 |
| Calcium Carbonate | 9.33 |
| Irgacure 2022 | 1.62 |

[1]Silquest A-189 is mercapatopropyltrimethoxy silane, available from Momentive Performance Matrerials, Inc.

All ingredients described in Table 6 were intimately mixed. A portion of the sealant composition was poured into a 2" diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm² UV energy, measured by a UV power puck, available from EIT, Inc of Sterling, Va., was applied to the sealant composition. Up to 1.5 inches of cured sealant was obtained.

A portion of the polymer composition was spread onto a 3"×6" AMS-C-27725 coated aluminum panel and cured according the method described previously. An approximately ⅛" thick cured polymer film was obtained. The film was further cut into two one-inch strips and the strips were pulled back at 180 degree angles with hands. The percent of adhesion to the substrate was recorded and the results were shown in Table 7.

TABLE 7

Adhesion of Various Polymer Compositions to AMS-C-27725 Coated Aluminum

| Composition | Adhesion |
|---|---|
| Example 13 | 100% Cohesive |
| Example 14 | 100% Cohesive |
| Example 15 | >95% Cohesive |
| Example 16 | 0% Cohesive |
| Example 17 | <50% Cohesive |

Whereas particular embodiments of this invention have been described above for purposes of illustration, it will be evident to those skilled in the art that numerous variations of the details of the present invention may be made without departing from the invention as defined in the appended claims

What is claimed is:

1. A method for making a cured sealant comprising:
   (a) depositing an unreacted sealant composition on a substrate; and
   (b) exposing the unreacted sealant composition to actinic radiation to provide a cured sealant, wherein the unreacted sealant composition comprises:
      (i) a thiol-terminated polythioether;
      (ii) a polyene comprising a polyvinyl ether compound; and
      a sulfur-containing ethylenically unsaturated silane adduct, wherein the sulfur-containing ethylenically unsaturated silane adduct comprises the reaction product of reactants comprising (i) a mercaptosilane, and (ii) a polyene,
   wherein the unreacted sealant composition comprises an essentially stoichiometric equivalent amount of thiol groups to ene groups.

2. The method of claim 1, wherein the thiol-terminated polythioether comprises a structure having the formula:

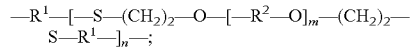

wherein
(1) each $R^1$ independently denotes a $C_{2-10}$ linear alkylene group, a $C_{2-6}$ branched alkylene group, a $C_{6-8}$ cycloalkylene group, a $C_{6-10}$ alkylcycloalkylene group, $-[(-CH_2-)_p-X-]_q-(-CH_2-)_r-$ or $-[(-CH_2-)_p-X-]_q-(-CH_2-)_r-$ in which at least one $-CH_2-$ unit is substituted with a methyl group, wherein:
   (i) each X is independently selected from O, S, and $-NR^6-$, wherein $R^6$ is hydrogen or methyl;
   (ii) p is an integer having a value ranging from 2 to 6;
   (iii) q is an integer having a value ranging from 0 to 5; and (iv) r is an integer having a value ranging from 2 to 10;
(2) each $R^2$ independently denotes a $C_{2-10}$ linear alkylene group, a $C_{2-6}$ branched alkylene group, a $C_{6-8}$ cycloalkylene group, a $C_{6-10}$ alkylcycloalkylene group, or $-[(-CH_2-)_p-X-]_q-(-CH_2-)_r-$, wherein:
   (i) each X is independently selected from O, S, and $-NR^6-$, wherein $R^6$ is hydrogen or methyl;
   (ii) p is an integer having a value ranging from 2 to 6;
   (iii) q is an integer having a value ranging from 0 to 5; and
   (iv) r is an integer having a value ranging from 2 to 10;
(3) m is a rational number from 0 to 10; and
(4) n is an integer having a value ranging from 1 to 60.

3. The method of claim 2, wherein the thiol-terminated polythioether has the formula:

HS—R$^1$—[—S—(CH$_2$)$_2$—O—[—R$^2$—O—]$_m$—(CH$_2$)$_2$—S—R$^1$—]$_n$—SH.

4. The method of claim 2, wherein the thiol-terminated polythioether has the formula:

B-(A-[R$^3$]$_y$—SH)$_z$ wherein:
(1) A denotes a structure having the formula:

—R$^1$—[—S—(CH$_2$)$_2$—O—[—R$^2$—O—]$_m$—(CH$_2$)$_2$—S—R$^1$—]$_n$—;

(2) y is 0 or 1;
(3) R$^3$ denotes a single bond when y=0 and —S—(CH$_2$)$_2$—[—O—R$^2$—]$_m$—O— when y=1;
(4) z is an integer from 3 to 6; and
(5) B denotes a z-valent residue of a polyfunctionalizing agent.

5. The method of claim 1, wherein the polyvinyl ether comprises the structure of Formula (IV):

CH$_2$=CH—O—((—R$^5$—O—)$_m$—CH=CH$_2$   (IV)

wherein R$^5$ is a C$_{2-6}$ linear alkylene group, a C$_{2-6}$ branched alkylene group, a C$_{6-8}$ cycloalkylene group, a C$_{6-10}$ alkylcycloalkylene group, or —[(—CH$_2$—)$_p$—O—]$_q$—(—CH$_2$—)$_r$—, where p is an integer having a value ranging from 2 to 6, q is an integer having a value ranging from 1 to 5, and r is an integer having a value ranging from 2 to 10.

6. The method of claim 1, wherein the polyvinyl ether comprises a divinyl ether.

7. The method of claim 1, wherein the polyene (b) comprises a polyallyl compound.

8. The method of claim 7, wherein the polyallyl compound comprises a triallyl compound.

9. The method of claim 8, wherein the triallyl compound comprises a cyanurate.

10. The method of claim 1, wherein the unreacted sealant composition further comprises a photoinitiator and the actinic radiation comprises ultraviolet radiation.

11. The method of claim 1, wherein:
(1) the mercaptosilane has the structure of formula (V)

HS—R—Si(R$^1$)$_m$(OR')$_{3-m}$   (V)

wherein,
(i) R is a divalent organic group;
(ii) R' is hydrogen or an alkyl group;
(iii) R$^1$ is hydrogen or an alkyl group; and
(iv) m is an integer from 0 to 2; and
(2) the polyene (ii) comprises a triene.

12. An unreacted composition comprising:
(a) a thiol-terminated polythioether; and
(b) a polyene comprising a polyvinyl ether compound; and
(c) a sulfur-containing ethylenically unsaturated silane adduct, wherein the sulfur-containing ethylenically unsaturated silane adduct comprises the reaction product of reactants comprising (i) a mercaptosilane, and (ii) a polyene,
wherein the composition comprises an essentially stoichiometric equivalent amount of thiol groups to ene groups.

13. The composition of claim 12, wherein the thiol-terminated polythioether comprises a structure having the formula:

—R$^1$—[—S—(CH$_2$)$_2$—O—[—R$^2$—O—]$_m$—(CH$_2$)$_2$—S—R$^1$—]$_n$—;

wherein
(1) each R$^1$ independently denotes a C$_{2-10}$ linear alkylene group, a C$_{2-6}$ branched alkylene group, a C$_{6-8}$ cycloalkylene group, a C$_{6-10}$ alkylcycloalkylene group, —[(—CH$_2$—)$_p$—X—]$_q$—(—CH$_2$—)$_r$— or —[(—CH$_2$—)$_p$—X—]$_q$—(—CH$_2$—)$_r$— in which at least one —CH$_2$— unit is substituted with a methyl group, wherein:
(i) each X is independently selected from O, S, and —NR$^6$—, wherein R$^6$ is hydrogen or methyl;
(ii) p is an integer having a value ranging from 2 to 6;
(iii) q is an integer having a value ranging from 0 to 5; and (iv) r is an integer having a value ranging from 2 to 10;
(2) each R$^2$ independently denotes a C$_{2-10}$ linear alkylene group, a C$_{2-6}$ branched alkylene group, a C$_{6-8}$ cycloalkylene group, a C$_{6-10}$ alkylcycloalkylene group, or —[(—CH$_2$—)$_p$—X—]$_q$—(—CH$_2$—)$_r$—, wherein:
(i) each X is independently selected from O, S, and —NR—, wherein R$^6$ is hydrogen or methyl;
(ii) p is an integer having a value ranging from 2 to 6;
(iii) q is an integer having a value ranging from 0 to 5; and
(iv) r is an integer having a value ranging from 2 to 10;
(3) m is a rational number from 0 to 10; and
(4) n is an integer having a value ranging from 1 to 60.

14. The composition of claim 12, wherein the polyene (b) comprises a polyallyl compound.

15. The composition of claim 12, wherein the polyvinyl ether comprises a divinyl ether.

16. The composition of claim 12, wherein:
(1) the mercaptosilane has the structure of formula (V)

HS—R—Si(R$^1$)$_m$(OR')$_{3-m}$   (V)

wherein,
(i) R is a divalent organic group;
(ii) R' is hydrogen or an alkyl group;
(iii) R$^1$ is hydrogen or an alkyl group; and
(iv) m is an integer from 0 to 2; and
(2) the polyene (ii) comprises a triene.

17. The composition of claim 12, wherein the ethylenically unsaturated silane adduct comprises at least one thiol group and at least one silane group.

18. The composition of claim 12, formulated as a sealant.

19. An unreacted composition comprising:
(a) a thiol-terminated polythioether;
(b) a polyene comprising a polyvinyl ether compound;
(c) a photoinitiator; and
(d) a sulfur-containing ethylenically unsaturated silane adduct, wherein the sulfur-containing ethylenically unsaturated silane adduct comprises the reaction product of reactants comprising (i) a mercaptosilane, and (ii) a polyene,
wherein the composition comprises an essentially stoichiometric equivalent amount of thiol groups to ene groups.

20. The composition of claim 19, wherein the thiol-terminated polythioether comprises a structure having the formula:

—R$^1$—[—S—(CH$_2$)$_2$—O—[—R$^2$—O—]$_m$—(CH$_2$)$_2$—S—R$^1$—]$_n$—;

wherein
(1) each R$^1$ independently denotes a C$_{2-10}$ linear alkylene group, a C$_{2-6}$ branched alkylene group, a C$_{6-8}$ cycloalkylene group, a C$_{6-10}$ alkylcycloalkylene group, —[(—CH$_2$—)$_p$—X—]$_q$—(—CH$_2$—)$_r$— or —[(—CH$_2$—)$_p$—X—]$_q$—(—CH$_2$—)$_r$— in which at least one —CH$_2$-unit is substituted with a methyl group, wherein:

(i) each X is independently selected from O, S, and —NR⁶—, wherein R⁶ is hydrogen or methyl;
(ii) p is an integer having a value ranging from 2 to 6;
(iii) q is an integer having a value ranging from 0 to 5; and (iv) r is an integer having a value ranging from 2 to 10;

(2) each $R^2$ independently denotes a $C_{2-10}$ linear alkylene group, a $C_{2-6}$ branched alkylene group, a $C_{6-8}$ cycloalkylene group, a $C_{6-10}$ alkylcycloalkylene group, or —[(—CH₂—)$_p$—X—]$_q$—(—CH₂—)$_r$—, wherein:
(i) each X is independently selected from O, S, and —NR—, wherein $R^6$ is hydrogen or methyl;
(ii) p is an integer having a value ranging from 2 to 6;
(iii) q is an integer having a value ranging from 0 to 5; and
(iv) r is an integer having a value ranging from 2 to 10;

(3) m is a rational number from 0 to 10; and
(4) n is an integer having a value ranging from 1 to 60.

21. The composition of claim 19, wherein the polyvinyl ether comprises a divinyl ether.

22. The composition of claim 19, wherein:
(1) the mercaptosilane has the structure of formula (V)

$$HS\text{—}R\text{—}Si(R^1)_m(OR')_{3-m} \qquad (V)$$

wherein,
(i) R is a divalent organic group;
(ii) R' is hydrogen or an alkyl group;
(iii) $R^1$ is hydrogen or an alkyl group; and
(iv) m is an integer from 0 to 2; and
(2) the polyene (ii) comprises a triene.

23. The composition of claim 19, wherein the ethylenically unsaturated silane adduct comprises at least one thiol group and at least one silane group.

24. The composition of claim 19, formulated as a sealant.

25. The composition of claim 19, wherein the polyene (b) comprises a polyallyl compound.

* * * * *